United States Patent
Shiraishi

(10) Patent No.: US 6,282,062 B1
(45) Date of Patent: Aug. 28, 2001

(54) MAGNETIC HEAD APPARATUS WITH HEAD IC CHIP

(75) Inventor: Masashi Shiraishi, Nagano (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/253,755

(22) Filed: Feb. 22, 1999

(51) Int. Cl.$^7$ ............... G11B 5/48; G11B 21/16
(52) U.S. Cl. ........................ 360/244.1; 360/244.3
(58) Field of Search ................ 360/244.1, 244.3, 360/245.8, 245.9

(56) References Cited

U.S. PATENT DOCUMENTS

| | | | |
|---|---|---|---|
| 4,558,510 | * 12/1985 | Tani et al. | 438/127 |
| 4,746,392 | * 5/1988 | Hoppe | 156/244.12 |
| 4,760,478 | * 7/1988 | Pal et al. | 360/104 |
| 4,789,914 | * 12/1988 | Ainslie et al. | 360/103 |
| 4,891,723 | * 1/1990 | Zak | 360/106 |
| 4,991,045 | * 2/1991 | Oberg | 360/104 |
| 5,187,625 | * 2/1993 | Blaeser et al. | 360/104 |
| 5,275,841 | * 1/1994 | Wong | 427/96 |
| 5,282,103 | * 1/1994 | Hatch et al. | 360/104 |
| 5,528,819 | * 6/1996 | McKay et al. | 29/603.07 |
| 5,572,387 | * 11/1996 | Brooks, Jr. et al. | 360/104 |
| 5,594,607 | * 1/1997 | Erpelding et al. | 360/104 |
| 5,606,477 | * 2/1997 | Erpelding et al. | 360/104 |
| 5,668,405 | * 9/1997 | Yamashita | 257/668 |
| 6,014,289 | * 1/2000 | Goss | 360/104 |
| 6,025,648 | * 2/2000 | Takahashi et al. | 257/778 |

FOREIGN PATENT DOCUMENTS

| | | |
|---|---|---|
| 53-69623 | 6/1978 | (JP) . |
| 55-150130 | 11/1980 | (JP) . |
| 3-108120 | 5/1991 | (JP) . |

OTHER PUBLICATIONS

Patent Abstracts of Japan and JP 8–255307A, Jan. 10, 1996.

* cited by examiner

*Primary Examiner*—William Klimowicz
(74) *Attorney, Agent, or Firm*—Arent Fox Kintner Plotkin & Kahn, PLLC

(57) ABSTRACT

A magnetic head apparatus includes a slider with at least one magnetic head element, a suspension having one end section, for supporting the slider at the one end section, a head IC chip mounted on the suspension, and a shock absorption layer for covering side surfaces and/or corner sections of head IC chip.

12 Claims, 3 Drawing Sheets

MAGNETIC HEAD APPARATUS WITH HEAD IC CHIP

FIELD OF THE INVENTION

The present invention relates to a magnetic head apparatus which includes a slider with at least one thin-film magnetic head element, a resilient suspension for supporting the slider and a head IC chip.

DESCRIPTION OF THE RELATED ART

In such magnetic head apparatus, the thin-film magnetic head element for writing magnetic information into and/or reading magnetic information from a magnetic recording medium such as a magnetic disk is in general formed on the slider flying in operation above the magnetic recording medium. The slider is supported by the suspension made of a resilient thin metal plate extended from one end of a movable arm of a magnetic disk drive unit.

The head IC chip is used for amplifying writing current to the magnetic head element, for amplifying reading current from the head element and for controlling the writing and reading operations of the head element. The head IC chip had been mounted on the movable arm located in a rearward position of the suspension or on a flexible printed cable (FPC) at a rearward position of the suspension. However, if the IC chip is mounted on the movable arm or on the FPC, lead lines for electrically connecting the magnetic head element with the IC chip become long causing noises to be easily generated. Also, the long lead lines provide some delay in rising and falling times of pulse signals due to parasitic capacitance and inductance of these lead lines causing the high rate transfer of data to make difficult.

In order to suppress the generation of noises from the lead lines, Japanese patent unexamined publications nos. 53(1978)-69623, 55(1980)-150130 and 3(1991)-108120 propose magnetic head apparatuses wherein the length of the lead lines is shortened by mounting the head IC chips on the sliders or on the suspensions.

These known apparatuses can prevent noises due to the long lead lines from generation. However, if the IC chip that will have some weight is mounted on the resilient suspension, the following problems may occur.
(1) Due to the additional weight applied to the suspension, the mechanical resonance characteristics of the resilient suspension will deteriorate.
(2) Due to the additional weight applied to the suspension, some impact applied to the hard magnetic disk drive unit (HDD) provided with such magnetic head apparatus may smash the IC chip to the hard magnetic disk surface causing fracture of the IC chip itself by shock.
(3) Due to poor heat radiation ability of the suspension, the IC chip itself will be heated to a high temperature by the writing current flowing through the IC chip during recording operation.

SUMMARY OF THE INVENTION

It is therefore an object of the present invention to provide a magnetic head apparatus with a head IC chip, whereby improved mechanical impact resistance of the head IC chip can be expected.

Another object of the present invention is to provide a magnetic head apparatus with a head IC chip, whereby the mechanical resonance characteristics of the resilient suspension can be prevented from deteriorating even if the head IC chip is mounted on the suspension.

According to the present invention, a magnetic head apparatus includes a slider with at least one magnetic head element, a suspension having one end section, for supporting the slider at the one end section, a head IC chip mounted on the suspension, and a shock absorption layer for covering side surfaces and/or corner sections of head IC chip.

Since covering side surfaces and/or corner sections of head IC chip are covered by the shock absorption resin, the IC chip itself and the hard magnetic disk surface can be protected from damage such as breakage even if the IC chip hardly impacts to the disk surface due to for example drop of HDD.

It is preferred that the shock absorption layer is made of a resin material with impact resistance characteristics.

It is also preferred that the apparatus further includes an underfill layer made of a resin material with high heat conductivity, filled between the suspension and the head IC chip, and that the shock absorption layer is made of the same resin material as that of the underfill layer.

By thus filling the high heat conductivity resin material, heat generated from the IC chip can be easily dissipated through the underfill layer into the suspension to extremely improve heat radiation characteristics. In addition, the underfill layer improves not only mechanical strength of this area but also reliability of the IC chip because the underfill layer covers the bottom surface of the IC chip. Furthermore, since the shock absorption layer is made of the same resin material as that of the underfill layer, these layers can be fabricated in the same process resulting that the number of manufacturing processes can be prevented from increasing.

It is preferred that the apparatus further includes a patterned resin layer formed on a part of the suspension between a bent hinge section and a section at which the head IC chip is mounted. It is also preferred that an additional patterned resin layer is formed on a part of the suspension near its base end or a base plate. By layering such patterned resin layer on the suspension, stiffness of the suspension will increase causing the impact resistance of the head IC chip mounted on the suspension to extremely improve. In addition, since this resin layer provides a dumping effect, it is expected to extremely improve the mechanical resonance characteristics of the suspension itself.

It is also preferred that the patterned resin layer is made of a flexible resin material.

Preferably, this patterned resin layer is made of a resin material with high heat conductivity. If the patterned resin layer is made of the same resin material as that of the underfill layer, these layers can be fabricated in the same process resulting that the number of manufacturing processes can be prevented from increasing.

It is preferred that the patterned resin layer is formed on one surface of the suspension, which will oppose to a magnetic disk surface in operation. However, the patterned resin layer can be formed on the other surface of the suspension.

It is also preferred that the head IC chip is mounted on the suspension by flip chip bonding.

Further objects and advantages of the present invention will be apparent from the following description of the preferred embodiments of the invention as illustrated in the accompanying drawings.

DESCRIPTION OF THE PREFERRED EMBODIMENTS

Figure 1:
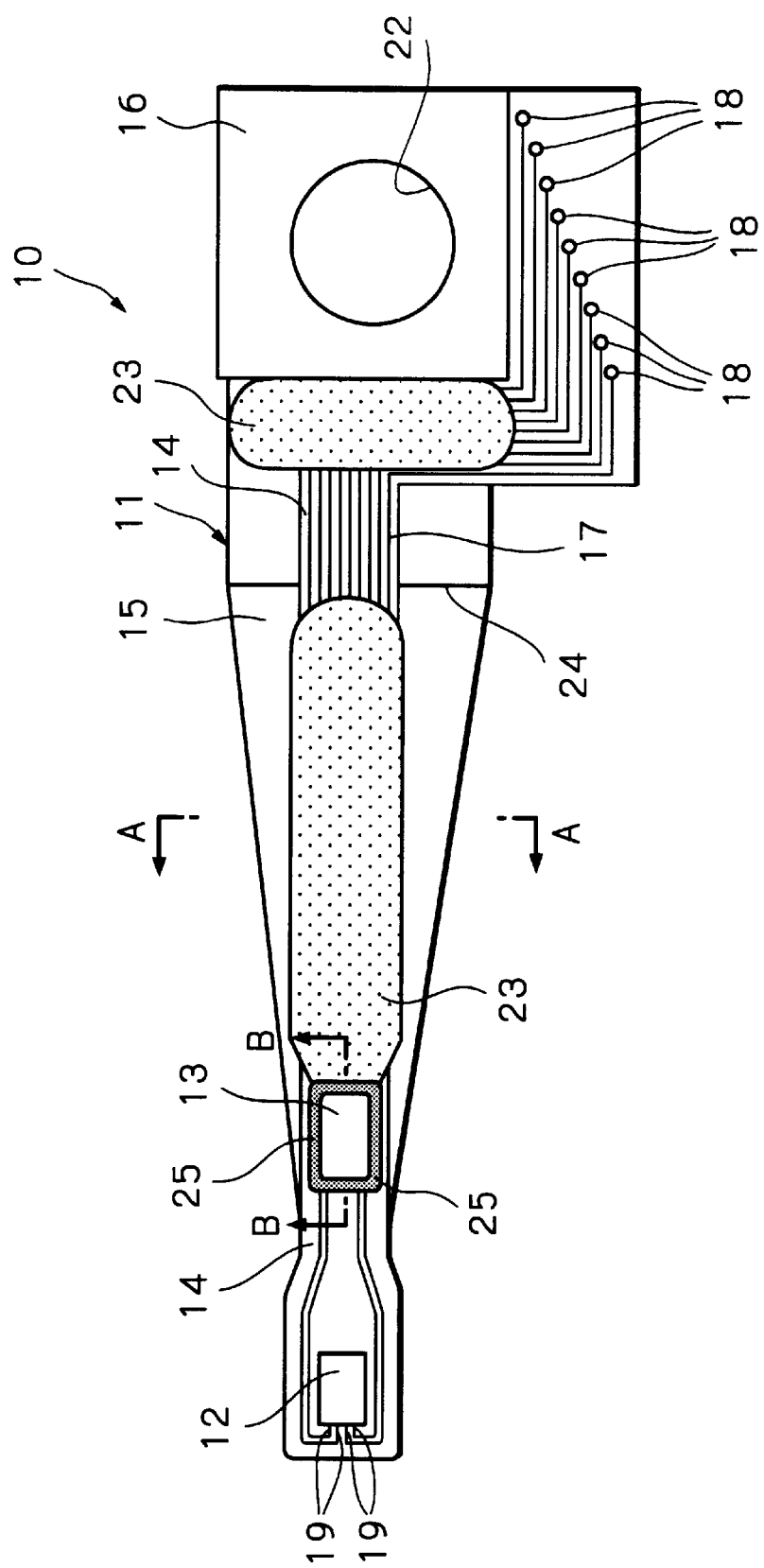
FIG. 1 shows a plane view, seen from a slider-attached surface side, of a preferred embodiment of a magnetic head apparatus according to the present invention.
Figure 2:
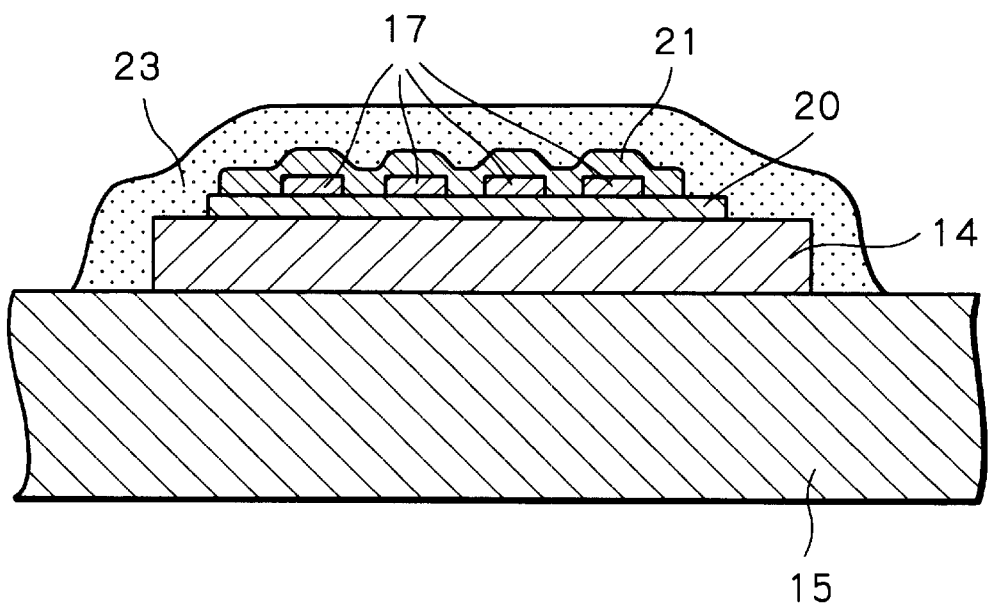
FIG. 2 shows a sectional view seen from A—A line of FIG. 1.

FIG. 1 illustrates a slider-attached surface of a magnetic head apparatus as a preferred embodiment of the present invention, and FIG. 2 illustrates an A—A line section of the apparatus.

In these figures, reference numeral 10 denotes a head-suspension assembly corresponding to the magnetic head apparatus according to the present invention. The head-suspension assembly 10 is assembled by fixing a slider 12 having a magnetic head element to a top end section of a suspension 11, and by mounting a head IC chip 13 on a middle location of this suspension 11. The slider 12 and the head IC chip 13 are fixed on a surface of the suspension 11, which will oppose to the magnetic disk surface in operation. This surface of the suspension is called hereinafter as a slider-attached surface.

As shown in FIG. 1, the suspension 11 is substantially constituted by a resilient flexure 14 which carries the slider 12 at its tongue located near its top end section and supports the head IC chip 13 at its middle location, a load beam 15 which supports and fixes the flexure 14, and a base plate 16 formed at a base end section of the load beam 15.

The flexure 14 is made of in this embodiment a stainless steel plate (for example SUS304TA) with a thickness of about 25 µm.

A conductor layer of a thin-film pattern 17 that constitutes necessary number of lead lines is formed on the flexure 14 along its length. One end of the conductor layer 17 (the base plate 16 side) is connected to connection terminals 18 connected to external circuits, and the other end of the conductor layer 17 is connected to connection terminals 19 formed at the top end section of the flexure 14.

The thin-film conductive pattern can be formed by a well-known method similar to the patterning method of forming a printed circuit board on a thin metal plate. Namely, as shown in FIG. 2, the conductive pattern is formed by sequentially depositing a first insulation material layer 20 made of a resin such as polylmide with a thickness of about 5 µm, a patterned Cu layer (conductive layer) 17 with a thickness of about 4 µm, and a second insulation material layer 21 made of a resin such as polyimide with a thickness of about 5 µm on the flexure 14 in this order. Within the regions of the connection terminals 18 and 19 and also connection pads described later, a Ni layer and an Au layer are sequentially deposited on the Cu layer and there is no second insulation material layer 21. In order to easily understand the structure, the conductor layer 17 is indicated by solid lines in FIG. 1.

The load beam 15 is made of in this embodiment a stainless steel plate with a thickness of about 70–75 µm and supports the flexure 14 along its whole length. This load beam 15 has a shape with a width that narrows with approaching to its top end. Fixing of the flexure 14 to the load beam 15 is achieved by means of a plurality of welded spots.

The base plate 16 is made of a stainless steel or iron and is fixed to the base end section of the load beam 15 by means of welded spots. The suspension 11 is attached to a movable arm (not shown) by fixing an attachment part of the base plate 16 to the movable arm. In modification, the head-suspension assembly may be formed in a two-pieces structure with a base plate and a flexure-load beam instead of the three-pieces structure with the flexure 14, the load beam 15 and the base plate 16.

As aforementioned, the slider 12 with the magnetic head element is mounted on the flexure 14 at the top end section of the suspension 11. The conductor layer 17 which includes the necessary number of lead lines passes both sides of the slider 12 and turns back at the top end section of the flexure 14 to the connection terminals 19 so as to be electrically connected with input/output electrodes of the slider 12. This connection area is covered by the insulation material layer made of the resin. In modification, a dimple may be formed between the load beam 15 and the flexure 14 at a location on which the slider 12 is mounted.

The head IC chip 13 is mounted on the slider-attached surface at the middle length location of the suspension 11. The head IC chip 13 has preferably a lightweight of 1 mg or less. Thanks to the lightweight of the IC chip, even if the IC chip 13 is mounted on the suspension 11, it can be expected to produce little ill effect to mechanical resonance characteristics of this suspension 11.

The head IC chip 13 in this embodiment is formed by a bear chip and mounted on and connected to, by the flip chip bonding, the connection pads formed on the way of the conductor layer 17 which is formed on the flexure 14 of the suspension 11 via the first insulation material layer 20.

As shown in FIGS. 1 and 2, a patterned resin layer 23 made of flexible resin material such as epoxy resin material is layered on the suspension 11. This resin layer 23 is formed, in an optional patterned shape, between a bent hinge section 24 of the load beam 15, which is called as "gram-load", and a section at which the head IC chip 13 is mounted and also near the base plate 16. In this embodiment, the resin layer 23 is formed to cover the flexure 14 and the insulation material layers 20 and 21 formed on the flexure 14 in the region from near the hinge section 24 to the end section of the head IC chip 13. Although the resin layer 23 is formed on the slider-attached surface of the suspension 11 in the embodiment, it is apparent that this resin layer 23 can be formed on the opposite surface of the suspension 11.

By layering such patterned resin layer 23 on the suspension, stiffness of the suspension 11 will increase causing the impact resistance of the head IC chip mounted on the suspension 11 to extremely improve. In addition, since this resin layer 23 provides a dumping effect, it is expected to extremely improve the mechanical resonance characteristics of the suspension 11 itself. If a harder resin material is used for the resin layer 23, stiffness of the suspension 11 increases and the impact resistance will be improved. Contrary to this, if a flexible resin material is used for the resin layer 23, greater damper effect of the suspension 11 can be expected resulting improved mechanical resonance characteristics.

Figure 3:
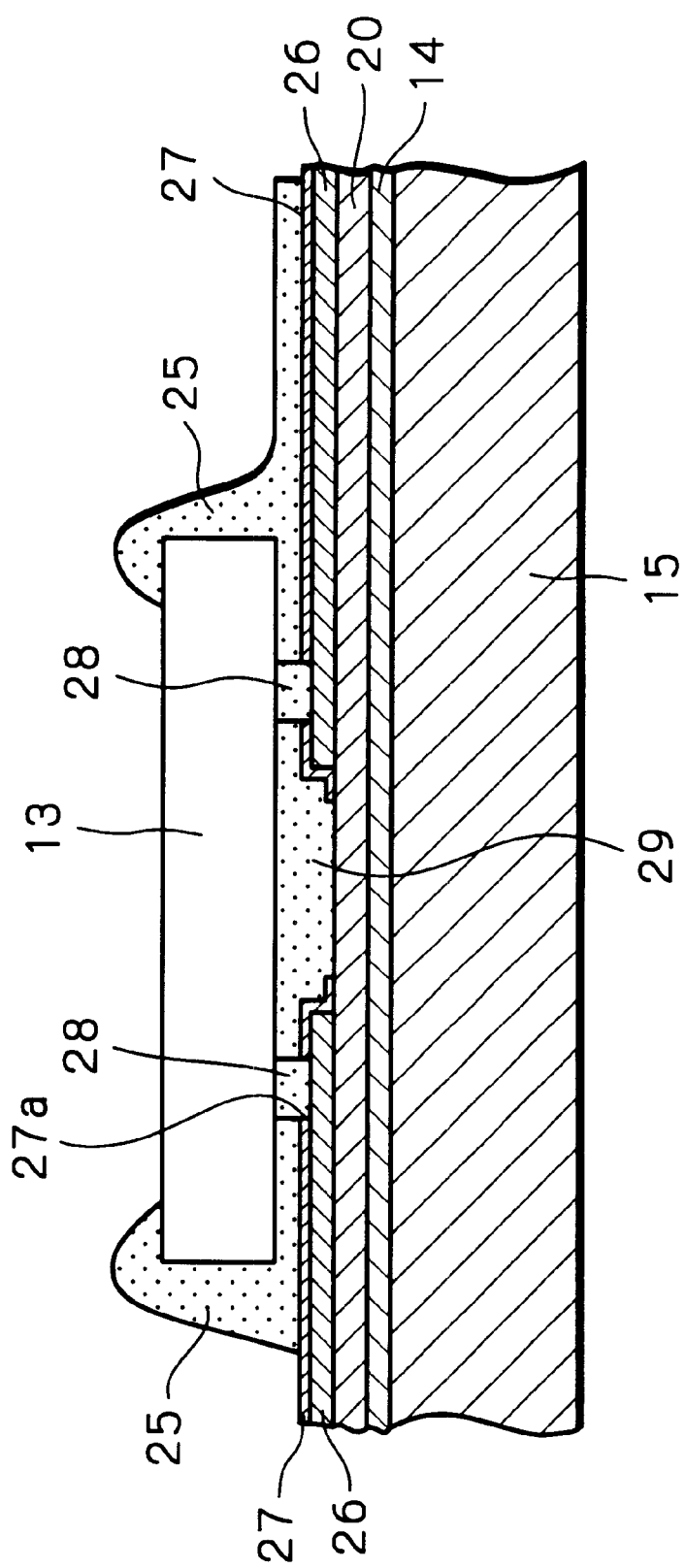
FIG. 3 shows a sectional view seen from B—B line of FIG. 1.

FIG. 3 illustrates a B—B line section of the apparatus FIG. 1.

As shown in FIGS. 1 and 3, side surfaces and four corner sections of the head IC chip 13 are covered by a shock absorption layer 25 made of for example epoxy resin material. Since a part of the IC chip 13 is covered by the resin, the IC chip 13 itself and the hard magnetic disk surface can be protected from damage such as breakage even if the IC chip 13 hardly impacts to the disk surface due to for example drop of the HDD which contains the magnetic head apparatus. Although both side surfaces and four corner sections of the head IC chip 13 are covered by the shock absorption layer 25 in this embodiment, some impact resistance of the head IC chip may be expected by covering only side surfaces or corner sections of the IC chip 13 with the shock absorption layer 25.

As shown in FIG. 3, on connection pads 26 which are a part of the conductor layer 17 formed on the first insulation material layer 20 on the flexure 14, an overcoat layer 27 made of a resin such as polyimide or high temperature endurance coating or film material with a thickness of about 1–5 μm are multi-layered. The overcoat layer 27 has openings 27a at positions corresponding to soldering bumps for the head IC chip 13. Thus, flow of the solder during flip chip bonding is controlled by the openings 27a so as to prevent the solder from spreading out. Thus, the height and the shape of soldered bonding portions 28 can be correctly controlled.

Since outflow of solder from the bonding portions 28 during the flip chip bonding is suppressed to ensure a sufficient height of the soldered bonding portions 28, for example about 50 μm, a space is provided between the first insulation material layer 20 on the flexure 14 and the bottom surface of the head IC chip 13. Therefore, an underfill of good heat conductivity material can be easily injected into the space to form an underfill layer 29. The underfill layer 29 will be made of mixture of a resin such as epoxy resin and insulation material with good heat conductivity.

The underfill resin with good heat conductivity composing the underfill layer 29 may be for example a resin such as epoxy resin containing fused silica (heat conductivity ratio of about $12\times10^{-4}$ cal/cm sec degrees), a resin containing alumina (heat conductivity ratio of about $40\times10^{-4}$ cal/cm sec degrees), a resin containing crystal silica (heat conductivity ratio of about $35\times10^{-4}$ cal/cm sec degrees), or a resin containing aluminum nitride (heat conductivity ratio of about $40\times10^{-4}$ cal/cm sec degrees).

By thus filling the underfill layer 29 with high heat conductivity resin, heat generated from the IC chip 13 can be easily dissipated through the filler material layer into the suspension 11 to extremely improve heat radiation characteristics. In addition, the underfill layer 29 improves not only mechanical strength of this area but also reliability of the IC chip 13 because the layer 29 covers the bottom surface thereof.

If the patterned resin layer 23 and/or shock absorption layer 25 are formed by the same resin material as that of this underfill layer 29, all of these layers 23, 25 and 29 can be fabricated in the same process resulting that the number of manufacturing processes can be prevented from increasing.

Many widely different embodiments of the present invention may be constructed without departing from the spirit and scope of the present invention. It should be understood that the present invention is not limited to the specific embodiments described in the specification, except as defined in the appended claims.

What is claimed is:

1. A magnetic head apparatus comprising:
    a slider with at least one magnetic head element;
    a suspension having one end section, for supporting said slider at said one end section;
    a head IC chip mounted on said suspension, said head IC chip having four side surfaces and four corner sections;
    a shock absorption layer for entirely covering each of said four side surfaces of said head IC chip; and
    an underfill layer made of a resin material with high heat conductivity, filled between said suspension and said head IC chip
    wherein said shock absorption layer is made of the same resin material as that of said underfill layer., 2. The apparatus as claimed in claim 1, wherein said shock absorption layer is made of a resin material with impact resistance characteristics.

3. The apparatus as claimed in claim 1, wherein said apparatus further comprises a patterned resin layer formed on a part of said suspension between a bent hinge section and a section at which said head IC chip is mounted.

4. The apparatus as claimed in claim 3, wherein said patterned resin layer is made of a flexible resin material.

5. The apparatus as claimed in claim 3, wherein said suspension has one surface which will oppose to a magnetic disk surface in operation, and wherein said patterned resin layer is formed on said one surface of said suspension.

6. The apparatus as claimed in claim 3, wherein said apparatus further comprises an additional patterned resin layer formed on a part of said suspension near its base end.

7. The apparatus as claimed in claim 6, wherein said additional patterned resin layer is made of a flexible resin material.

8. The apparatus as claimed in claim 6, wherein said suspension has one surface which will oppose to a magnetic disk surface in operation, and wherein said additional patterned resin layer is formed on said one surface of said suspension.

9. The apparatus as claimed in claim 1, wherein said head IC chip is mounted on said suspension by flip chip bonding.

10. The apparatus as claimed in claim 1, wherein said shock absorption layer also covers all of said four corner sections of said head IC chip.

11. A magnetic head apparatus comprising:
    a slider with at least one magnetic head element;
    a suspension having one end section, for supporting said slider at said one end section;
    a head IC chip mounted on said suspension, said head IC chip having four side surfaces and four corner sections;
    a shock absorption layer for entirely covering each of said four side surfaces of said head IC chip;
    a patterned resin layer formed on a part of said suspension between a bent hinge section and a section at which said head IC chip is mounted; and
    an underfill layer made of a resin material with high heat conductivity, filled between said suspension and said head IC chip,
    wherein said patterned resin layer is made of the same resin material as that of said underfill layer.

12. A magnetic head apparatus comprising:
    a slider with at least one magnetic head element;
    a suspension having one end section, for supporting said slider at said one end section;
    a head IC chip mounted on said suspension, said head IC chip having four side surfaces and four corner sections;
    a shock absorption layer for entirely covering each of said four side surfaces of said head IC chip;
    a patterned resin layer formed on a part of said suspension between a bent hinge section and a section at which said head IC chip is mounted;
    an additional patterned resin layer formed on a part of said suspension near its base end; and
    an underfill layer made of a resin material with high heat conductivity, filled between said suspension and said head IC chip,
    wherein said additional patterned resin layer is made of the same resin material as that of said underfill layer.

* * * * *

UNITED STATES PATENT AND TRADEMARK OFFICE
CERTIFICATE OF CORRECTION

PATENT NO. : 6,282,062 B1
DATED : August 28, 2001
INVENTOR(S) : Masashi Shiraishi It is certified that error appears in the above-identified patent and that said Letters Patent is hereby corrected as shown below:

<u>Title page,</u>
Please add the following: -- Foreign Application Priority Data
Item [30], Feb. 27, 1998 (JP) 10-062039 --

Signed and Sealed this

Thirtieth Day of April, 2002

*Attest:*

JAMES E. ROGAN
*Director of the United States Patent and Trademark Office*

*Attesting Officer*